(12) United States Patent
Neukirch et al.

(10) Patent No.: US 10,809,472 B2
(45) Date of Patent: Oct. 20, 2020

(54) OPTICAL FIBER FERRULES INCORPORATING A GLASS FACEPLATE AND METHODS OF FABRICATING THE SAME

(71) Applicant: CORNING OPTICAL COMMUNICATIONS LLC, Charlotte, NC (US)

(72) Inventors: Ulrich Wilhelm Heinz Neukirch, Painted Post, NY (US); Wesley Allan Yates, Granite Falls, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/556,750

(22) Filed: Aug. 30, 2019

(65) Prior Publication Data

US 2019/0384024 A1  Dec. 19, 2019

Related U.S. Application Data

(63) Continuation of application No. PCT/US2018/020656, filed on Mar. 2, 2018.
(Continued)

(51) Int. Cl.
*G02B 6/42* (2006.01)
*G02B 6/38* (2006.01)

(52) U.S. Cl.
CPC ......... *G02B 6/4292* (2013.01); *G02B 6/3854* (2013.01); *G02B 6/3885* (2013.01); *G02B 6/423* (2013.01)

(58) Field of Classification Search
None
See application file for complete search history.

(56) References Cited

U.S. PATENT DOCUMENTS

| 5,185,846 A | 2/1993 | Basavanhally et al. |
| 5,339,376 A | 8/1994 | Kakii et al. |

(Continued)

FOREIGN PATENT DOCUMENTS

WO  1999005552 A1  2/1999

OTHER PUBLICATIONS

He et al; "Fabrication of Hollow Optical Waveguides in Fused Silica by Three-Dimensional Femtosecond Laser Micromachining"; Appl Phys B (2011) 105: pp. 379-384.
(Continued)

*Primary Examiner* — Jerry Rahll
(74) *Attorney, Agent, or Firm* — Grant A. Gildehaus (57) ABSTRACT

Embodiments of the present disclosure are directed to hybrid optical fiber ferrules and methods of fabricating the same. In one embodiment, an optical fiber ferrule includes a glass faceplate, a plastic body molded about the glass faceplate, and at least one fiber through-hole extending through the plastic body. In another embodiment, a method of fabricating an optical fiber ferrule includes disposing a glass faceplate within a die comprising at least one fiber die pin, an injecting the die with plastic to form a plastic body such that the glass faceplate is embedded within the plastic body, wherein the at least one fiber die pin defines at least one fiber through-hole. Other materials with suitable coefficients of thermal expansion may be used for the faceplates of the fiber optic ferrules according to the concepts disclosed.

34 Claims, 9 Drawing Sheets

Related U.S. Application Data (60) Provisional application No. 62/467,850, filed on Mar. 7, 2017.

(56) References Cited

U.S. PATENT DOCUMENTS

| | | |
|---|---|---|
| 6,402,389 B1 | 6/2002 | Steijer et al. |
| 8,768,125 B2 | 7/2014 | Beatty et al. |
| 9,360,632 B2 * | 6/2016 | Arao et al. |
| 10,191,218 B2 * | 1/2019 | Wada ............... G02B 6/262 |
| 2005/0158005 A1 | 7/2005 | Otsuka et al. |
| 2008/0144999 A1 | 6/2008 | Takeda et al. |
| 2014/0105543 A1 * | 4/2014 | de Jong ............ G02B 6/3885 |
| | | 385/77 |
| 2014/0147623 A1 | 5/2014 | Shorey et al. |
| 2014/0270651 A1 | 9/2014 | Kadar-Kallen et al. |
| 2015/0104135 A1 * | 4/2015 | Bushnell ............ G02B 6/325 |
| | | 385/79 |
| 2015/0166395 A1 | 6/2015 | Marjanovic et al. |
| 2016/0041347 A1 | 2/2016 | Hodge et al. |
| 2017/0192180 A1 | 7/2017 | Andrus et al. |

OTHER PUBLICATIONS

Marcinkevicius et al; "Femtosecond Laser-Assisted Three-Dimensional Microfabrication in Silica"; Optics Letters; vol. 26, No. 5 (2001) pp. 277-279.

Sabano et al; "Development of Reference MT Ferrule Using Insert-Molded Metal Plate"; IEEE; OFC/NFOEC (2008) 3 Pages.

* cited by examiner

OPTICAL FIBER FERRULES INCORPORATING A GLASS FACEPLATE AND METHODS OF FABRICATING THE SAME

PRIORITY APPLICATION

This application is a continuation of International Application No. PCT/US18/20656, filed on Mar. 2, 2018, which claims the benefit of priority to U.S. Application No. 62/467,850, filed on Mar. 7, 2017, both applications being incorporated herein by reference.

BACKGROUND

The present disclosure generally relates to high-bandwidth optical communication and, more particularly, to optical fiber ferrules incorporating a glass fiber faceplate and methods of their fabrication.

Benefits of optical fiber include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between components.

As the bandwidth of optical transceiver devices increases by advanced techniques such as silicon-based laser systems and wavelength division multiplexing, large amounts of data must be transferred from the active devices and associated electronics to electronic components of the computing device (e.g., a data switching device of a data center) for further processing (e.g., up to 100 Gbps per channel). Further, the optical mode size of optical transceiver devices (e.g., laser diodes, photodiodes) and the core diameter of optical fibers decrease with the transition from multi-mode to single-mode fiber, which presents challenges in maintaining proper alignment between the transceiver device and the optical connector to which it is connected.

In silicon-based photonic devices, such as hybrid-silicon lasers and silicon optical modulators, optical signals are propagated through the device within optical waveguides. In some laser devices, the optical signals exit the device through an edge such that the optical signals do not turn prior to being emitted from the edge. Currently, optical fibers are permanently attached the optical waveguides at the edge of the silicon-based photonic device (i.e., an optical chip). The optical fibers may be attached to the edge of the chip using a UV curable adhesive, for example. The opposite end of the optical fibers may include an optical connector that may be disposed in a front face of a server device for optical connection to external computing components.

However, the alignment of the optical fibers to the optical waveguides at the edge of the optical chip requires an expensive and time consuming active alignment process (e.g., a vision-based active alignment process). Such active alignment processes add significant costs, and severely reduces throughput.

Further, the fiber coatings associated with the optical fibers cannot survive the elevated temperatures of a subsequent solder reflow process. The optical chip will typically be provided on a daughterboard that is attached to a motherboard by a solder reflow process, for example. Thus, the optical fibers cannot be attached to the optical chip until the daughterboard is permanently attached to the motherboard. Therefore, the optical chip and the entire photonics sub-assembly cannot be tested until it is permanently attached to the motherboard and the optical fibers are permanently attached to the edge of the optical chip. If the photonics sub-assembly fails the testing procedure, it must be manually removed from the motherboard and scrapped, resulting in significant costs and reduction in throughput.

Accordingly, alternative devices for providing an optical fiber device capable of being removably coupled to an edge of an optical chip to enable testing of the optical chip prior to a solder reflow process are desired.

SUMMARY

Embodiments of the present disclosure are directed to glass-plastic hybrid optical fiber ferrules and their manufacture that enable optical fibers to be removably coupled to an edge of an optical chip. The ability to reliably mate and de-mate the optical fiber ferrule to the edge of the optical chip enables the optical chip to be tested prior to subsequent solder reflow processes, such as a solder reflow process that attaches a photonics sub-assembly including the optical chip to a motherboard.

The optical fiber ferrules described herein incorporate a glass faceplate near the front of the ferrule for inhibiting movement of the ends of optical fibers disposed within the optical fiber ferrule due to the relatively large coefficient of thermal expansion of plastic. The glass faceplate has a coefficient of thermal expansion that is a closer match to the coefficient of thermal expansion of silicon of the optical chip, compared with the plastic body. Consequently, the devices disclosed preserve the optical performance of the device over a relatively large temperature range since the faceplate of the ferrule formed by a material with a closer thermal match that inhibits the movement of the optical fibers due to thermal expansion or contraction and maintains suitable alignment. In this regard, an optical fiber ferrule includes a glass faceplate, a plastic body molded about the glass faceplate, and at least one fiber through-hole extending through the plastic body. The optical fiber ferrules disclosed herein may be a portion of an assembly having one or more optical fibers attached to the ferrule. For instance, the optical fiber ferrule may be a portion of a cable assembly or other suitable assembly.

In another embodiment, an optical connection includes an optical chip including at least one active optical component and at least one optical waveguide optical coupled to the active optical component, an optical receptacle coupled to the optical chip, and an optical fiber ferrule. The optical fiber ferrule includes a glass faceplate, a plastic body molded about the glass faceplate, and at least one fiber through-hole extending through the plastic body. The optical connection further includes at least one optical fiber disposed within the at least one fiber through-hole. The optical fiber ferrule is configured to be mated to the optical receptacle such that the at least one optical fiber is optically coupled to the at least one optical waveguide.

In yet another embodiment, a method of fabricating an optical fiber ferrule includes disposing a glass faceplate within a die comprising at least one fiber die pin, an injecting the die with plastic to form a plastic body such that the glass faceplate is attached to the plastic body, wherein the at least one fiber die pin defines at least one fiber through-hole. The concepts may also use a faceplate made of materials other than glass that are suitably matched to the coefficient of thermal expansion of an optical chip such as a silicon faceplate or a fused silica faceplate.

In another embodiment, an optical fiber ferrule comprises a glass faceplate having at least one glass fiber through hole and at least one alignment hole, and a plastic body molded about the glass faceplate. The plastic body comprising at least one fiber through-hole extending through the plastic body, and at least one alignment bore. The at least one glass fiber through hole of the glass faceplate is lined with a portion of the plastic body.

In yet another embodiment, an optical fiber ferrule comprises a faceplate having a material with a predetermined coefficient of thermal expansion and at least one glass fiber through hole. The predetermined coefficient of thermal expansion is in the range of 2.6±0.8 parts per million per degree Celsius. Other embodiments may have the predetermined coefficient of thermal expansion is in the range of 2.6±0.5 parts per million per degree Celsius. A plastic body is molded about the glass faceplate and comprises at least one fiber through-hole extending through the plastic body, and the plastic body comprises at least one alignment bore.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments described herein are directed to optical fiber ferrules operable to be removably mated to an edge of an optical chip. Thus, embodiments described herein enable optical fibers to be repeatedly mated and de-mated at the optical chip. The ability to connect and disconnect the optical fiber ferrule to and from the optical chip improves the manufacturing process of a photonics sub-assembly including the optical chip, as well as a server device (e.g., a datacenter switch) that incorporates the photonics sub-assembly. The embodiments described herein enable manufactures of photonics sub-assemblies to connect optical fibers within an optical fiber ferrule to an edge of an optical chip, thereby optically coupling the optical fibers of the optical fiber ferrule to optical waveguides of the optical chip. The optical chip may be tested using optical signals sent and received on the optical fibers. If the optical chip and the photonics sub-assembly are deemed satisfactory, the optical fiber ferrule is disconnected from the optical chip and the photonics sub-assembly is subjected to a solder reflow process, which may be utilized to electrically couple one or more photonics sub-assemblies to a motherboard, for example. After the solder reflow process, the optical fiber ferrule may be reconnected to the optical chip.

Optical chips, such as those that perform optical-to-electrical and/or electrical-to-optical conversion, operate at relatively high operating temperatures (e.g., up to 90° C.). The plastic material used to fabricate traditional optical fiber ferrules has a higher coefficient of thermal expansion (CTE) (e.g., about 18 ppm/° C.) than that of the material of the optical chip (e.g., about 3 ppm/° C. depending on the materials). This CTE mismatch may shift the position of the ends of the optical fibers during operation with respect to the optical waveguides, thereby causing misalignment. For single mode optical fibers, the tolerance is typically ±1.0 µm. Thus, plastic optical fiber ferrules holding multiple optical fibers at a small pitch (e.g., less than about 500 µm) are incapable of being connected to an edge of the optical chip due to the CTE of the plastic material and resulting shifting position of the multiple optical fibers.

Embodiments of the present disclosure comprise a faceplate made of a suitable material at a front end of a hybrid optical fiber ferrule to influence (or match) the thermal movement of the ends of the optical fibers maintained within the ferrule to the complimentary device. One example of the hybrid optical fiber ferrule uses a glass faceplate and a plastic body molded about the glass faceplate, but other materials are possible for the faceplate. The glass faceplate inhibits movement of the ends of the optical fibers in the ferrule during temperature variations compared with the plastic material. Conventional optical fiber ferrules have an entire mating face formed from of a material such as plastic that has a non-matching CTE compared with the material of an optical chip which results in a large thermal mismatch and may cause misalignment of the optical channels with changes in temperature due to the two different materials. The concepts disclosed herein are directed to optical fiber ferrules comprising a faceplate with a CTE that is matched within a range of CTEs to the material of the optical chip so that during thermal changes suitable optical alignment is maintained. In other words, the designs of the optical fiber ferrule disclosed herein allow the optical fibers within the ferrule to remain in proper position with respect to the optical waveguides of the optical chip during thermal variations.

The concepts disclosed do not require the faceplate to form the entire mating face of the fiber optic ferrule, but embodiments may have the faceplate form the entire mating face of the ferrule if desired. In some embodiments, one or more of the through-holes of the faceplate may be lined with a plastic material of the ferrule body at the mating face of the ferrule, which still allows suitable mating thermal performance with the optical chip or the like. In other words, one or more of the fiber through-hole extend through the plastic body to the mating face of the ferrule, but the front portion of the through-hole is a small portion of plastic disposed within a through-hole of the faceplate. This is advantageous since it makes manufacturing the optical fiber ferrule easier by not requiring precision alignment of the faceplate in the ferrule or precision forming of the through-holes in the faceplate, but instead uses the molding process to form the precision geometry of the ferrule for a small portion of the mating face. Although various embodiments of optical fiber fibers comprising a glass faceplate and their methods of manufacture are described in detail below, other suitable materials for the faceplate may be used for the faceplate as described.

Figure 1:
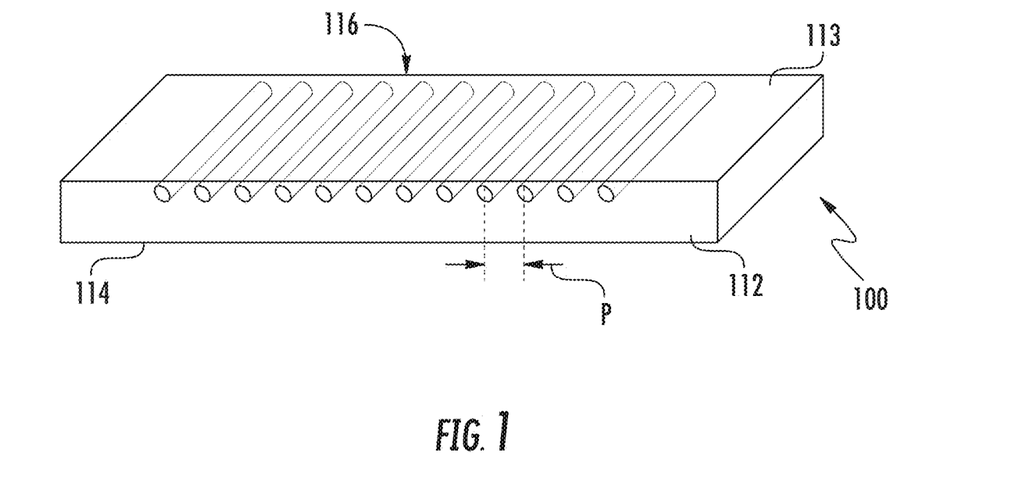
FIG. 1 schematically depicts an example optical chip according to one or more embodiments described and illustrated herein.

Referring now to FIG. 1, a partial perspective view of an optical chip 100 is schematically illustrated. The optical chips 110 described herein may be configured as silicon-based photonic devices, such as hybrid-silicon lasers and silicon optical modulators. The optical chip may be configured as an optical transceiver and/or receiver. As such the optical chip 100, or one or more components optically coupled to the optical chip 100, may include active optical components, such as laser diodes for transmitting optical signals and photodiodes for receiving optical signals (not shown). As used herein, the term "optically coupled" means that optical signals are able to pass between two elements, such as between adjacent optical waveguides, for example.

The optical chip 100 may be configured as one or multiple layers of material such as without limitation, silicon, glass, or indium phosphide. The optical chip 100 comprises one or more optical waveguides 116. The one or more optical waveguides 116 may be disposed within a bulk of the optical chip 100 or on a first surface 113 (e.g., top surface) of the optical chip 100. The one or more optical waveguides have a higher refractive index than the surrounding areas of the material of the optical chip. The one or more optical waveguides 116 may be fabricated from any known or yet-to-be-developed process to modify the index of refraction of the material of the optical chip 100. Example processes include, but are not limited to, ion-exchange processes and laser writing processes. Other optical waveguides may be utilized, such as, without limitation, planar glass dielectric waveguides, embedded optical fiber waveguides, and polymer waveguides.

FIG. 1 depicts a plurality of optical waveguides 116 embedded below the first surface 113 and terminating at an edge 112 of the optical chip 100. The plurality of optical waveguides 116 has a pitch p, which may take on any value depending on the end application. As one non-limiting example, the pitch p may be within a range of 80 µm and 300 µm. As another non-limiting example, the pitch p may be 125 µm or 250 µm. It should be understood that other pitch values may be employed. Any number of optical waveguides 116 may be utilized depending on the design of the optical chip 100. Further, although the optical chip 100 is illustrated with one row of optical waveguides 116, embodiments are not limited thereto. For example, another row of optical waveguides may be located proximate to a second surface 114 opposite from the first surface 113.

It is noted that, in some embodiments, the optical chip 100 may be mounted on a base substrate, such as a circuit board. In embodiments, the optical chip 100 may be component of a sub-assembly (e.g., a daughterboard) of a larger motherboard, such as, without limitation, a motherboard of a server device.

Figure 2:
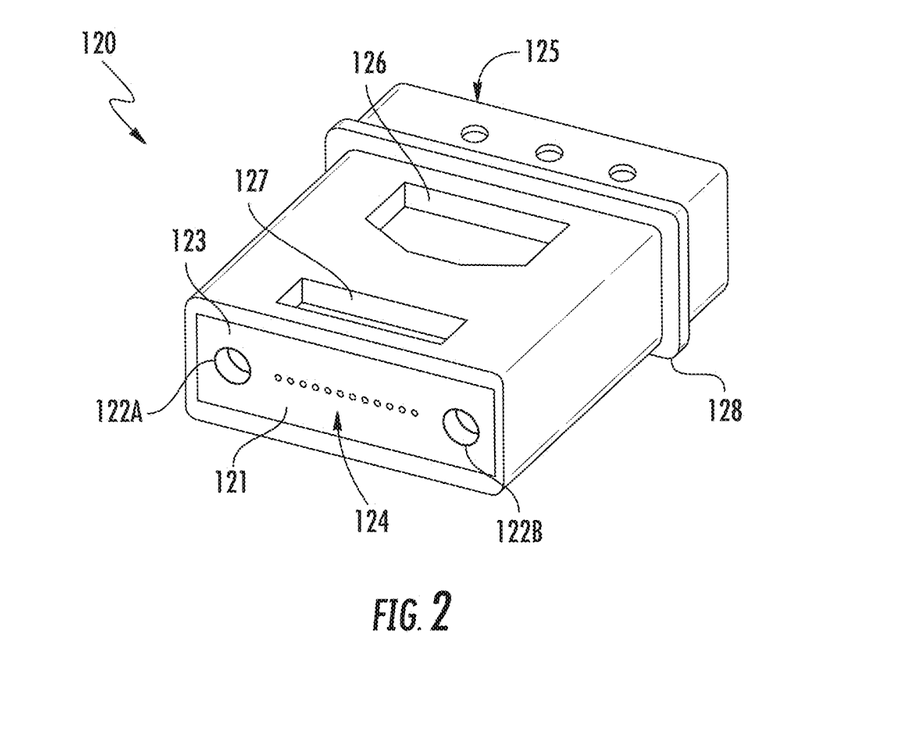
FIG. 2 schematically depicts an example glass-plastic hybrid optical fiber ferrule according to one or more embodiments described and illustrated herein.

Embodiments of the present disclosure enable de-mateable optical connection to the plurality of optical waveguides 116 at the edge 112 of the optical chip 100. Referring now to FIG. 2, an example optical fiber ferrule 120 is schematically illustrated. The example optical fiber ferrule 120 is configured as a mechanical transfer ferrule (MT ferrule), such as MT-type ferrules sold by US Conec of Hickory, N.C. The example optical fiber ferrules described herein may be incorporated in a fiber optic connector, such as the MT-type fiber optic connector depicted in FIG. 10. It should be understood that embodiments described herein are not limited to MT-type ferrules and connectors, and that the concepts described herein may be incorporated into other optical fiber ferrule configurations.

The optical fiber ferrule 120 comprises a plastic body 125 molded about a glass faceplate 121. CTE matching to the optical chip material is only required at the front face of the optical fiber ferrule 120 which presents the polished fiber ends to their respective optical waveguides 116. Thus, in embodiments, only the front face of the optical fiber ferrule 120 is made of glass, while the remaining portion is made of injection moldable plastic used for current ferrules, for example.

The plastic body 125 may be fabricated from any suitable thermoplastic or thermoset plastic. The plastic body 125 may include optional features such as openings 126 that provide access to optical fibers (not shown) disposed therein. For example, the openings 126 may be filled with adhesive to set the optical fibers in place within the plastic body.

The glass faceplate 121 includes one or more glass fiber through-holes 124 into which one or more optical fibers (not shown) are disposed when attached to the optical fibers. The glass faceplate 121 may comprise a common fiber through-hole configured as a slot as discussed herein that is sized for receiving more than one optical fiber in the through-hole.

Alternatively, the glass faceplate 121 may have individual through-holes 124 sized for receiving an individual optical fiber. Further, fiber through-holes of the glass faceplate may be larger (e.g., a larger diameter) than the fiber through-hole extending through the plastic body.

Figure 3A:
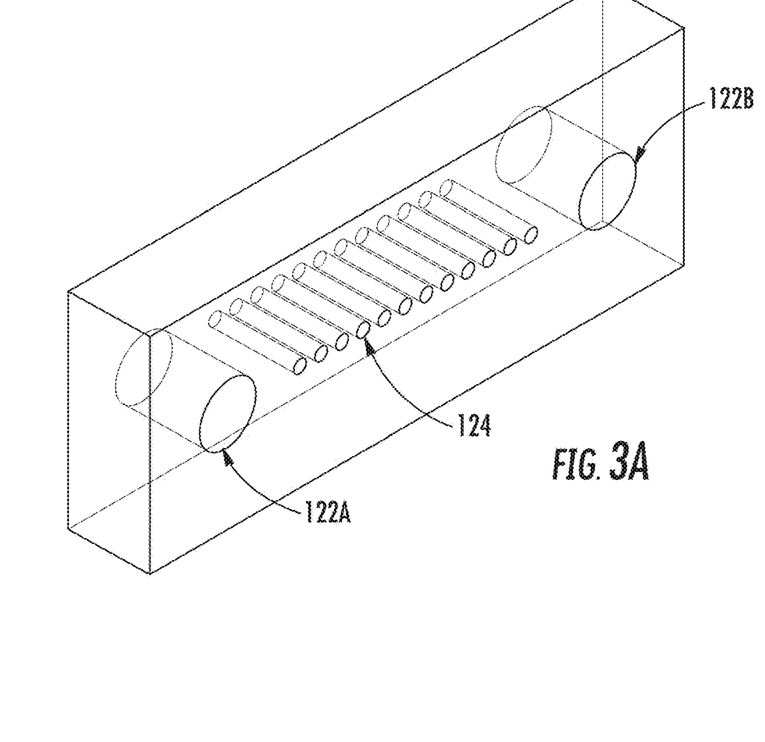
FIG. 3A schematically depicts a perspective view of a glass faceplate according to one or more embodiments described and illustrated herein.

FIG. 3A illustrates the glass faceplate 121 of FIG. 2 in isolation. FIGS. 2 and 3A illustrate twelve glass fiber through-holes 124, which corresponds to the twelve optical waveguides 116 of the optical chip 100. As described in more detail below, the glass fiber through-holes 124 of the glass faceplate 121 are aligned with, and thus optically coupled to, fiber through-holes 127 (see FIG. 5) located within the plastic body 125.

In the illustrated example, the glass faceplate 121 comprises a first alignment hole 122A and a second alignment hole 122B outboard of the plurality of glass fiber through-holes 124. As described in more detail below, the first and second alignment holes 122A, 122B may be configured to receive first and second alignment pins of a mated receptacle, or to receive first and second alignment pins that are inserted into corresponding alignment holes of a mated receptacle.

The glass faceplate 121 is made of a material having a CTE closer to the CTE of the silicon (about 2.6 ppm/° C.) of the optical chip 100. The material chosen for the glass faceplate 121 may be any material having a CTE close to the CTE of the optical chip such that movement of the ends of the optical fibers 130 is inhibited during operation of the optical chip (e.g., an operational temperature range of 10° C.-90° C.), and to enable multiple mating/de-mating cycles. As one non-limiting example, the glass faceplate 121 may be fabricated from borosilicate glass, but other glass materials or non-glass materials are possible with the concepts disclosed.

The glass faceplate 121 may have any thickness such that movement of the ends of the optical fibers 130 is restricted due to the operating temperature of the optical chip 100 as well as other electrical devices in proximity to the optical chip 100. As an example and not a limitation, the glass faceplate 121 has a thickness that is greater than or equal to 0.5 millimeters and less than or equal to 2.0 millimeters. In one embodiment, the faceplate has a thickness of 1 millimeter or less, but other thicknesses are possible.

The diameter of the plurality of glass fiber through-holes 124 is configured to accept a desired plurality of optical fibers 130. The plurality of glass fiber through-holes 124 has a pitch that matches the pitch p of the plurality of optical waveguides 116 of the optical chip 100. As an example and not a limitation the diameter of the plurality of glass fiber through-holes 124 may be greater than or equal to 50 µm and less than or equal to 200 µm. In one non-limiting example, each of the glass fiber through-holes 124 is about 125 µm in diameter and may be about a micron larger to accommodate the optical fibers, but other sized through-holes are possible for different sized optical fibers. In another non-limiting example, the plurality of fiber through-holes has a pitch of 125 µm and each fiber through hole of the plurality of fiber through holes has a diameter of 80 µm. It should be understood that other diameter and pitch values may be utilized for the plurality of glass fiber through holes 124 depending on the particular application.

The plurality of glass fiber through-holes 124 and the first and second alignment holes 122A, 122B may be formed within the glass faceplate 121 by any known or yet-to-be developed process. As a non-limiting example, the plurality of glass fiber through-holes 124 may be formed by a laser-damage-and-etch process in which an ultrafast pulsed laser damages the glass material at the desired location of a through-hole. The damaged region(s) of the glass material etch at a significantly faster rate than the non-damaged region(s). Thus, with selective etching, precision through-holes may be created within the glass material.

Any laser-damage-and-etch process may be utilized to fabricate the glass fiber through-holes 124 within the glass faceplate 121. In one non-limiting process, a short-pulse laser in combination with line focus optics is used to drill a pilot hole or laser damage region, completely through the body of the glass sheet with each laser pulse. The line focus optics creates a focal line that is equal to or greater than the thickness of the glass faceplate 121. An advantage of this process is that each laser pulse fully forms a pilot hole or laser damage region. Thus, the time to make a pilot hole or laser damage region is extremely short (e.g., approximately, 10 psec with a single pulse, for example, or approximately hundreds of nanoseconds even with a complete burst pulse). The glass faceplate 121 may then be exposed to an etching solution, such as a hydrofluoric acid-based etching solution, to preferentially etch the pilot hole or damage line within the glass faceplate, thereby forming a glass fiber through-hole having the desired diameter. More detail regarding example laser line focus and etching processes is provided in U.S. Pat. Publ. No. 2015/0166395, which is hereby incorporated by reference in its entirety.

In other embodiments, a percussion laser-drilling process using a pulsed ultraviolet (UV) laser is used to drill through the glass faceplate to form a pilot hole or damage region. With each pulse, glass material is removed to sequentially drill the pilot hole. A depth of the beam waist of the pulsed laser beam is adjusted so that the drilling occurs deeper within the glass faceplate until the pilot hole or damage region extends fully though the glass faceplate 121. The glass faceplate may then be exposed to an etching solution to preferentially etch the pilot hole or damage region. In some embodiments, a sacrificial cover layer may be applied to a laser entrance surface or a laser exit surface of the glass faceplate to improve hole circularity and aspect ratio (i.e., the ratio of the hole opening diameter to the minimum diameter of the hole). Example percussion laser drilling and etching processes are described in U.S. Pub No. 2014/0147623 which is hereby incorporated by reference in its entirety.

Many glass faceplates 121 may be fabricated from a single large sheet of glass. The entire glass sheet, or many sheets simultaneously, may be etched to remove the glass material and form the desired through-holes. Further processing may be performed, such as processes to smooth the etched glass sheets. Individual glass faceplates 121 may be separated from the glass sheet by a score-and-break process (e.g., either mechanically or by a laser) or any other known or yet-to-be-developed singulation process.

Advantageously, the different glass types may selected based on CTE properties that work well with other materials of the optical connection. One explanatory example is a borosilicate glass having a CTE of 3.3 parts per million per degree Celsius (ppm/C). Consequently, the borosilicate glass is within a suitable CTE range for use with other materials such as in silicon photonic applications. Silicon has a CTE (2.6 ppm/C) within about 1 ppm/C of borosilicate glass CTE allowing suitable thermal performance. In other embodiments, the faceplates may be selected from other suitable materials other than glass or silicon as desired for their CTE or other material properties. One such example would be an optical fiber ferrules comprising a faceplate made of a material within a range of matching of CTEs as desired.

By way of example, the faceplates may use a material having a CTE in the range of as 2.6±0.5 parts per million per degree Celsius, but other ranges for the CTE are possible as well. Further, the materials may be selected such that the faceplate material has a CTE with a closer match to the optical chip material CTE. Still other materials may be used as the faceplate of the optical fiber ferrule such as a ceramic material with suitable material characteristics. These alternative materials for the faceplates may be used with the optical fiber ferrule concepts disclosed herein.

Unlike ferrules that having bodies or faces formed from conventional metals, the concepts of the present application match the coefficients of thermal expansion to the mating materials for preserving optical performance over a range of temperatures.

The CTE-matched, precision-formed glass faceplate 121 and plastic body 125 forms a glass-plastic hybrid assembly. This glass-plastic hybrid assembly may be created in a single step using a plastic injection-molding process where the glass faceplate 121 is inserted into a molding die (not shown) before the thermoplastic (or thermoset) is injected. The molding die may be an un-modified molding die utilized to fabricate traditional optical fiber ferrules, such as MT-type optical fiber ferrules.

Figure 3B:
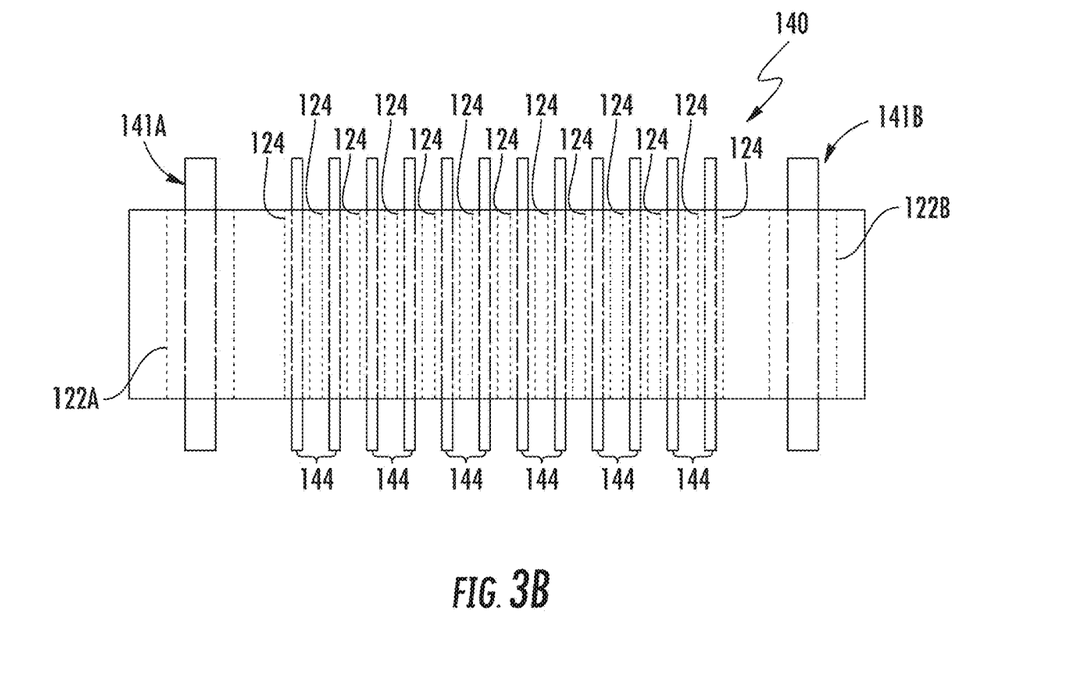
FIG. 3B schematically depicts a partial view of a glass faceplate in a die for fabricating a glass-plastic hybrid optical fiber ferrule according to one or more embodiments described and illustrated herein.

Referring to FIG. 3B, the glass faceplate 121 may be inserted into a molding die 140 such that a first alignment die pin 141A is inserted into the first alignment hole 122A of the glass faceplate 121, a second alignment die pin 141B is inserted into the second alignment hole 122B of the glass faceplate 121, and a plurality of fiber die pins 144 is inserted into the plurality of glass fiber through-holes 124.

In some embodiments, the diameters of the first alignment hole 122A, the second alignment hole 122B and the plurality of glass fiber through-holes 124 are larger than the outer diameters of the first alignment die pin 141A, the second alignment die pin 141B and the plurality of fiber die pins 144, respectively. Thus, when the molding die 140 is injected with plastic, plastic fills in the gaps between walls of the first alignment hole 122A, the second alignment hole 122B and the plurality of glass fiber through-holes 124 and the first alignment die pin 141A, the second alignment die pin 141B and the plurality of plurality of fiber die pins 144, respectively. Thus, the walls of the holes of the glass faceplate become lined with plastic material following the molding process. This results in one or more plastic fiber through-holes 127 within the glass fiber through-holes 124. Utilizing larger diameter through-holes relaxes the required tolerances of the glass faceplate 121, which, in turn, reduces the cost of manufacturing the glass faceplate 121.

The plastic material also forms a first alignment bore 133A and a second alignment bore 133B within the plastic body 125 that are aligned with the first and second alignment holes 122A, 122B of the glass faceplate 121. When the first and second alignment holes 122A, 122B have a larger diameter than the first and second alignment die pins 141A, 141B as shown in FIGS. 3 and 4, the first and second alignment bores 133A, 133B are disposed within the first and second alignment holes 122A, 122B.

Figure 4:
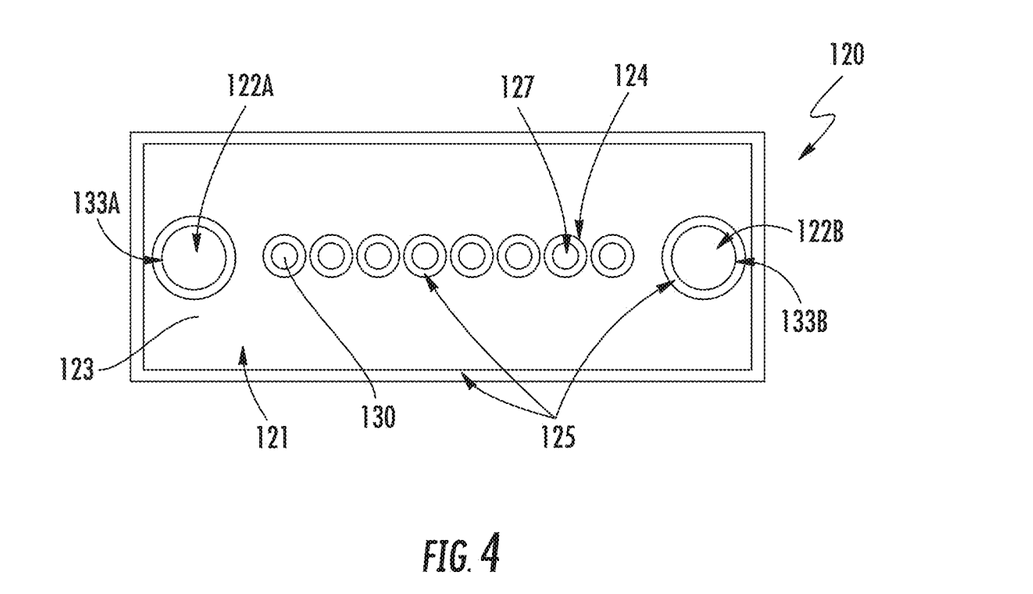
FIG. 4 schematically depicts a front view of a glass-plastic hybrid optical fiber ferrule according to one or more embodiments described and illustrated herein.

FIG. 4 depicts a front view of an example optical fiber ferrule 120 after the injection molding process. As shown in FIG. 4, the glass faceplate 121 is surrounded by, and embedded within the plastic body 125. Further, plastic material of the plastic body 125 is also present within the first alignment hole 122A, the second alignment hole 122B and the plurality of glass fiber through-holes 124. The resulting injection molding process and presence of plastic material in the plurality of glass fiber through-holes 124 results in a plurality of fiber through-holes 127 having the desired diameter disposed within the glass fiber through-holes 124. Similarly, the presence of plastic material within the first and second alignment holes 122A, 122B yields a desired diameter.

It should be understood that, in other embodiments, the diameters of the first alignment hole 122A, the second alignment hole 122B and the plurality of glass fiber through-holes 124 are equal to, or slightly larger than, the outer diameters of the first alignment die pin 141A, the second alignment die pin 141B and the plurality of fiber die pins 144. In such embodiments, little to no plastic material is present within the holes of the glass faceplate 121.

Figure 5:
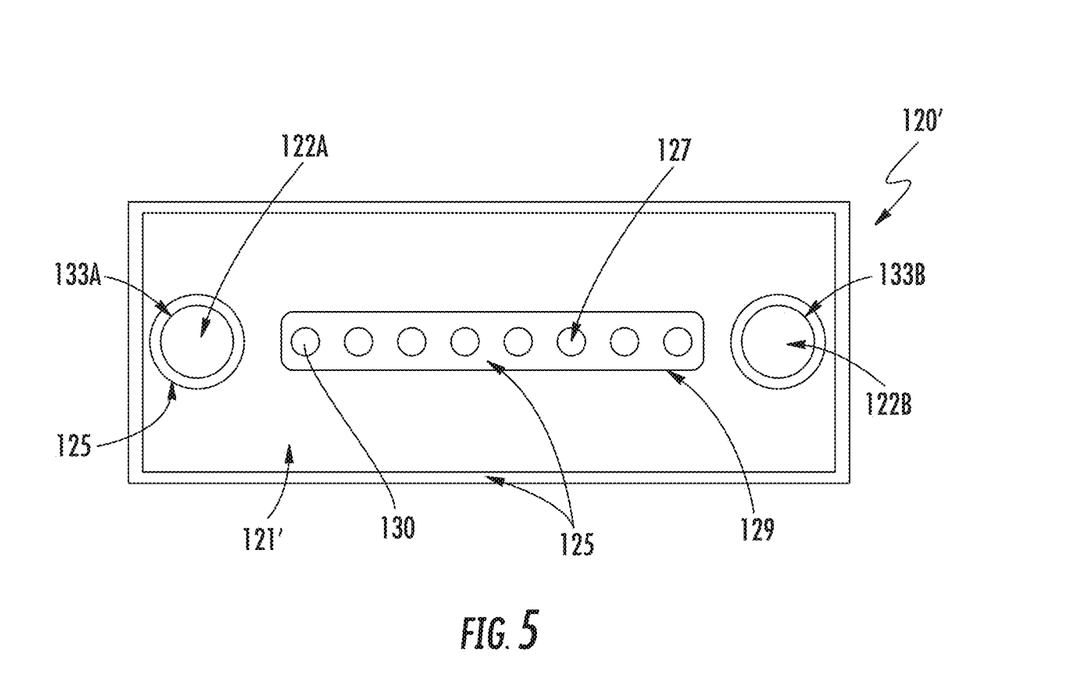
FIG. 5 schematically depicts a front view of another glass-plastic hybrid optical fiber ferrule according to one or more embodiments described and illustrated herein.

Referring now to FIG. 5, a front view of another example optical fiber ferrule 120' is schematically illustrated. In this example, the glass faceplate 121' comprises a glass-fiber through-hole configured as a slot 129 rather than individual glass fiber through-holes 124 as depicted in FIGS. 2-4. Thus, the need to fabricate individual, precision glass fiber through-holes 124 is avoided. Instead, the slot 129 acts as a common through-hole in the faceplate for a plurality of optical fibers. In this embodiment, the slot 129 allows the plastic material to flow more easily around the fiber die pins 144 during the molding process. The fiber die pins 144 form fiber through-holes 127 fabricated from plastic that are present within the slot 129. The presence of the glass faceplate 121', and the location of the fiber through-holes 127 within the slot 129, inhibits movement of the optical fibers 130. Even though the plastic material surrounds portions of the optical fibers, a large portion of the ferrule at the mating side is formed from the faceplate with the matched CTE material.

Figure 7A:
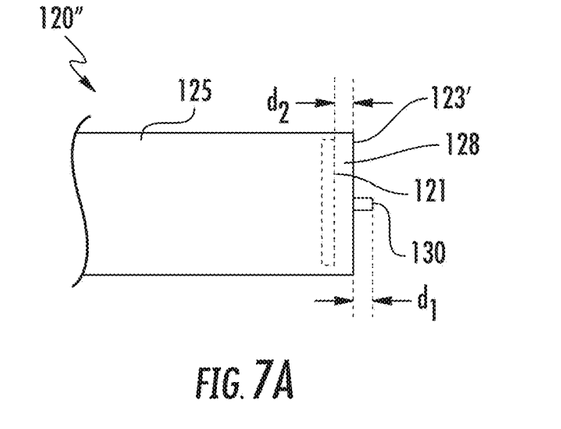
FIG. 7A schematically depicts a side view of another glass-plastic hybrid optical fiber ferrule including a plastic cover layer and an optical fiber extending beyond a front face of the glass-plastic hybrid optical fiber ferrule according to one or more embodiments described and illustrated herein.

In yet other embodiments, the glass faceplate 121 is completely buried within the plastic body 125 proximate the end face of the optical fiber ferrule (see FIG. 7A, described below). This may be achieved by holding the glass faceplate 121 in the die using spacers (not shown) at a defined distance from the very front of the optical fiber ferrule 120. During molding, the front face of the optical fiber ferrule 120 will be covered with a layer of plastic (i.e., a plastic cover layer 128, FIG. 7A). The glass faceplate 121 of FIG. 4 or the glass faceplate 121' of FIG. 5 may be buried within the plastic body 125, for example. The presence of the glass faceplate 121 inhibits movement of the ends of the optical fibers.

In yet other embodiments, the entire optical fiber ferrule is fabricated from glass. In such an embodiment, all alignment bores and fiber through-holes or bores are disposed within the glass material of the glass optical fiber ferrule.

Figure 6:
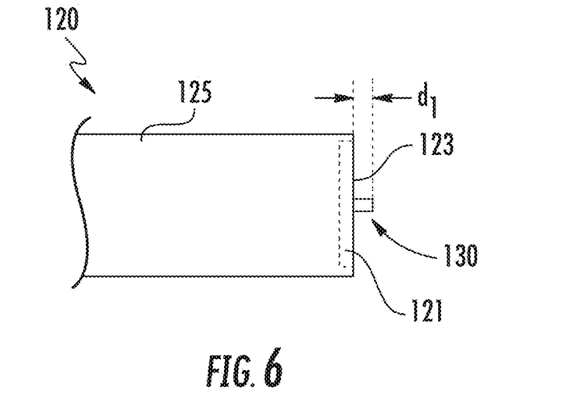
FIG. 6 schematically depicts a side view of a glass-plastic hybrid optical fiber ferrule including an optical fiber extending beyond a front face of the glass-plastic hybrid optical fiber ferrule according to one or more embodiments described and illustrated herein.

Referring to now FIG. 6, the optical fibers 130 may be disposed within the optical fiber ferrule 120 such that the optical fibers 130 extend beyond an end surface 123 of the optical fiber ferrule 120 by a distance $d_1$ (e.g., 1-2 μm). The end surface 123 may be polished such that the optical fibers 130 are flush with the end surface 123 defined by the glass faceplate 121.

Figure 7B:
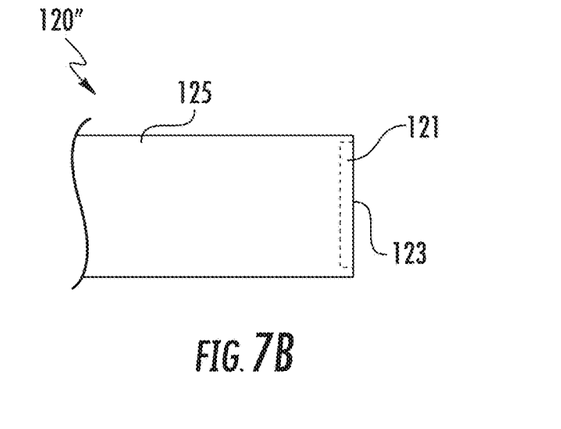
FIG. 7B schematically depicts a side view of the glass-plastic hybrid optical fiber ferrule depicted in FIG. 7A after a polishing process according to one or more embodiments described and illustrated herein.

When polishing the end faces of traditional optical fiber ferrules made of plastic, a certain amount of plastic material is removed from the end face (e.g., without limitation, about 100 μm). Thus, the embodiment wherein a plastic cover layer 128 is present on the glass faceplate 121 enables conventional polishing techniques to be used. FIG. 7A depicts a side view of an optical fiber ferrule 120" wherein the glass faceplate 121 is embedded within the plastic body 125, and a plastic cover layer 128 is disposed on a front face of the glass faceplate 121. The optical fibers 130 extend beyond an end surface 123' defined by the plastic cover layer 128. The plastic cover layer 128 has a thickness of $d_2$, which may be, without limitation, about 50 µm to about 200 µm. The thickness $d_2$ may be such that, when the optical fiber ferrule 120" is polished by traditional polishing techniques, the plastic cover layer 128 is completely removed, thereby exposing the glass faceplate 121, as shown in FIG. 7B. In other embodiments, a portion of the plastic cover layer 128 may remain after the polishing process. In such embodiments, the geometry of the ferrule endface and fiber ends after polishing would be like that of a standard MT ferrule.

Additional features may be provided on either the glass faceplate 121 or a plastic cover layer 128 to reduce polishing time during manufacturing and reduce sensitivity to dust and debris when mated. As an example, one or more pedestals may be provided on the glass faceplate 121 or plastic cover layer 128, as described in International Patent Application WO/2016/053674, which is hereby incorporated by reference in its entirety.

Figure 8:
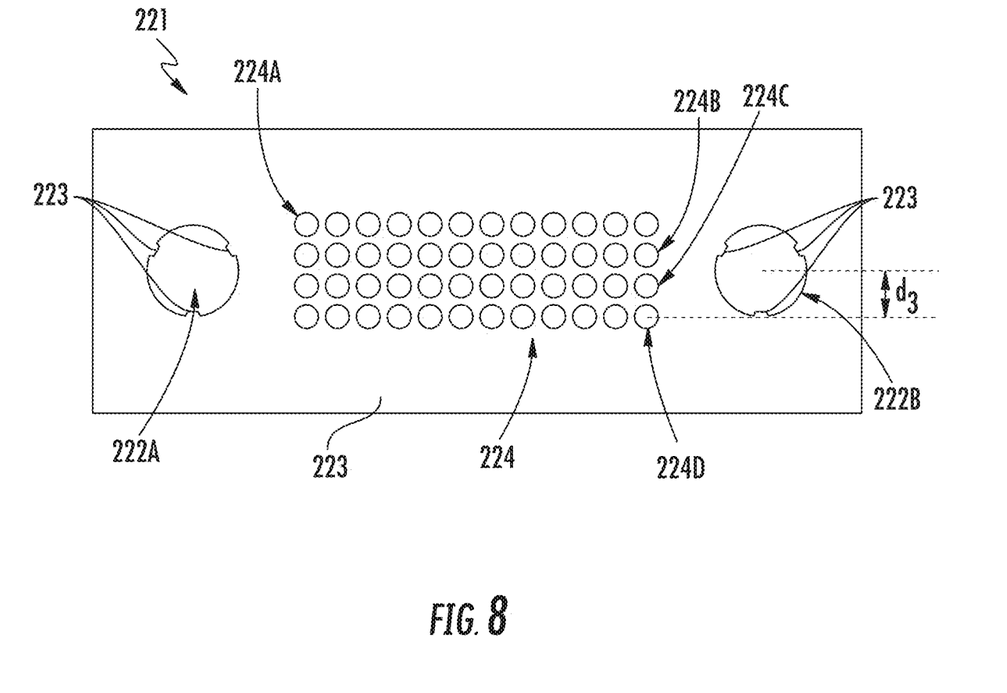
FIG. 8 schematically depicts a front view of an example glass faceplate according to one or more embodiments described and illustrated herein.
Figure 9:
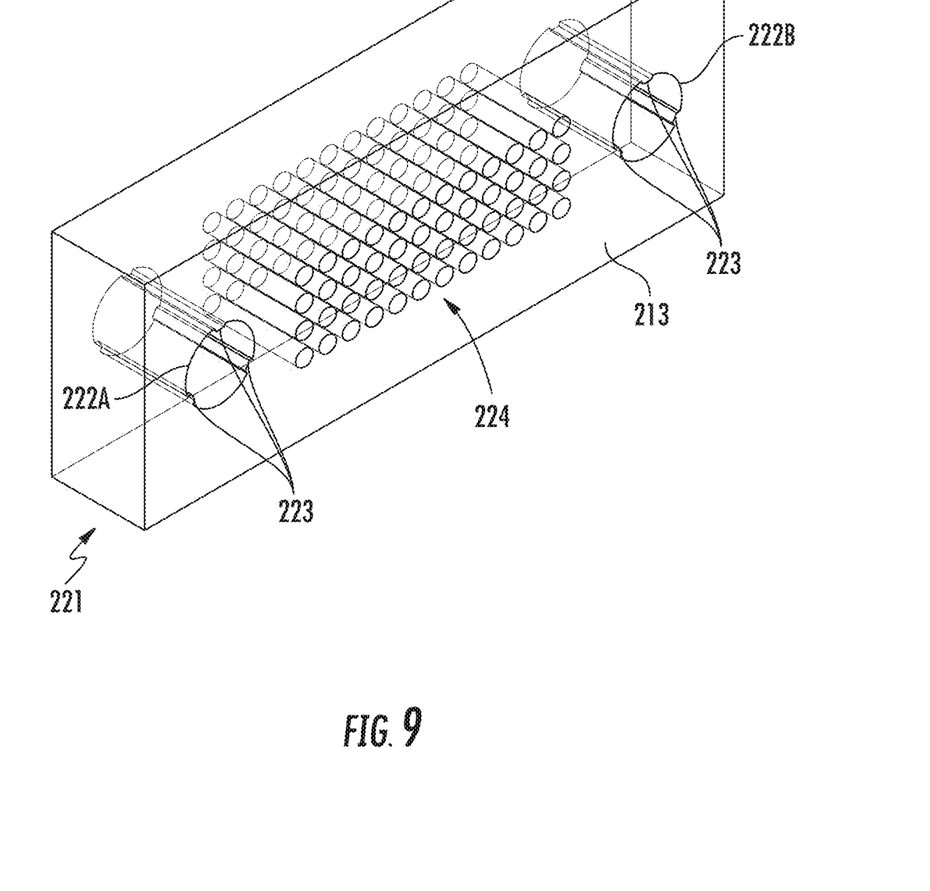
FIG. 9 schematically depicts a perspective view of the example glass faceplate depicted in FIG. 8.

As stated above, the glass faceplate may take on many configurations. FIGS. 8 and 9 schematically depict a glass faceplate 221 having a plurality of glass fiber through-holes 224 defined by a first row of glass fiber through-holes 224A, a second row of glass fiber through-holes 224B, a third row of glass fiber through-holes 224C, and a fourth row of glass fiber through holes 224D. A first alignment hole 222A and a second alignment hole 222B are located outboard of the plurality of glass fiber through-holes 224. In the illustrated embodiment, the first alignment hole 222A and the second alignment hole 222B each have tab features 223 that are configured to contact alignment die pins during the molding process so that the alignment die pins are precisely positioned within the first alignment hole 222A and the second alignment hole 222B. It should be understood that other configurations are also possible.

Figure 10:
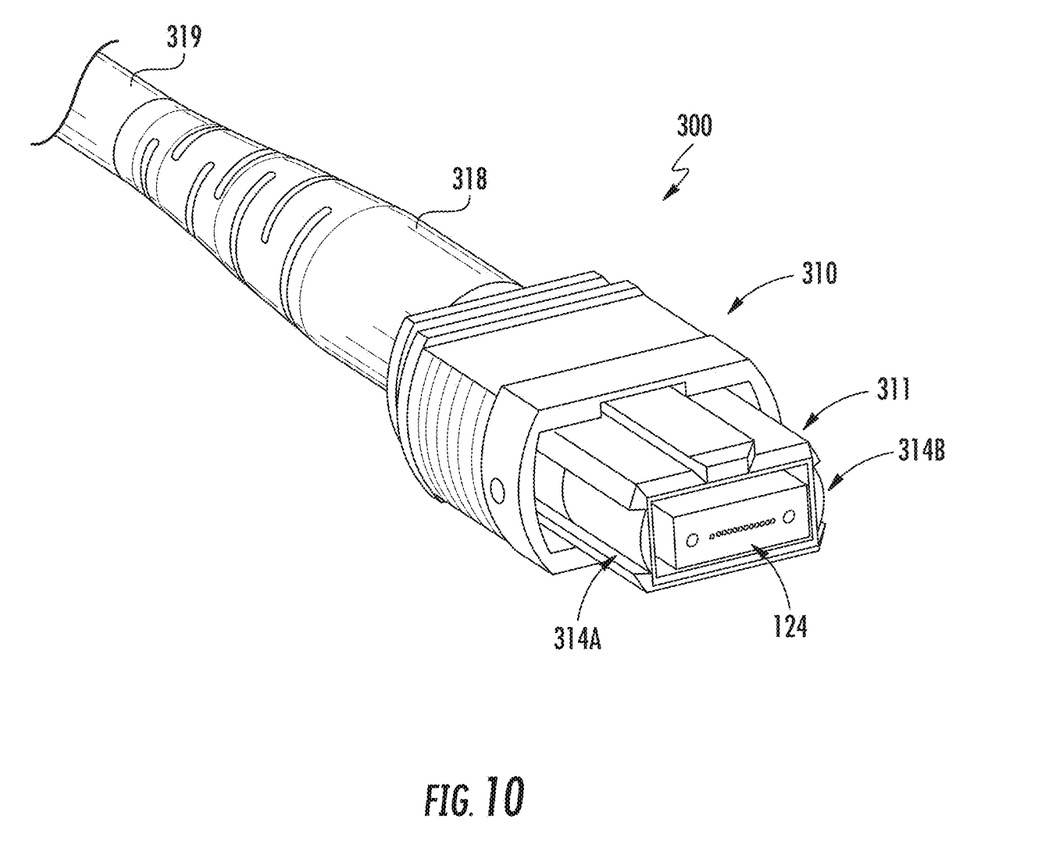
FIG. 10 schematically depicts a perspective view of an example fiber optic connector including an example glass-plastic hybrid optical fiber ferrule according to one or more embodiments described and illustrated herein.

As noted hereinabove, the optical fiber ferrules described herein may be incorporated into a fiber optic connector. FIG. 10 schematically depicts a perspective view of an example fiber optic connector 300 configured as an MT-type connector. It should be understood that embodiments described herein are not limited to the fiber optic connector depicted in FIG. 10, and that the optical fiber ferrules described herein may be provided in other connector configurations. The example fiber optic connector 300 comprises a connector housing 310, an optical fiber ferrule 120 having a glass faceplate 121, a strain relief 318, and a fiber optic cable 319. In the illustrated embodiment, the connector housing 310 includes an inner housing 311 and an outer housing 316 that surrounds the inner housing 311. The inner housing 311 may include a keying feature 312 to ensure that the fiber optic connector 300 is connected to a corresponding receptacle in a proper orientation. The inner housing 311 may also include notches 314 that engage corresponding features of a receptacle (not shown) to facilitate engagement between the fiber optic connector 300 and a mated receptacle. The optical fiber ferrule 120 is exposed by the inner housing 311. One or more optical fibers (not shown) are disposed within the fiber optic cable 319 and the optical fiber 120.

The optical fiber ferrules described herein are configured to be mechanically coupled to an edge of an optical chip. In embodiments, a receptacle structure is mounted on the optical chip that is configured to receive the optical fiber ferrules described herein. The receptacle of the optical chip may take on many configurations.

Figure 11:
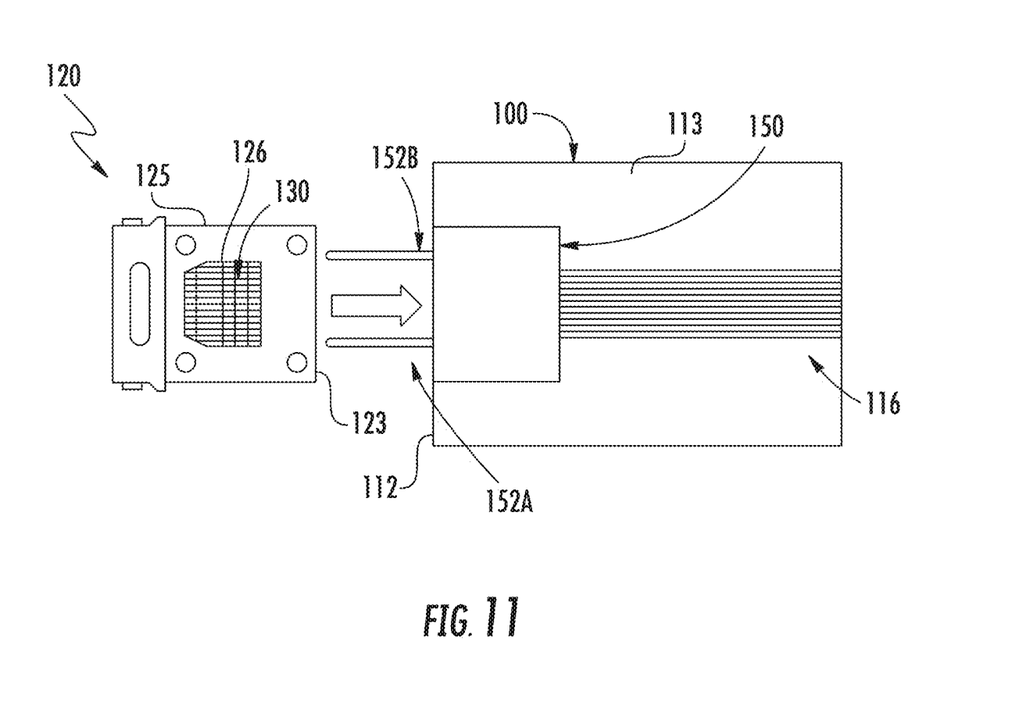
FIG. 11 schematically depicts a top view of an example optical connection comprising a glass-plastic hybrid optical fiber ferrule, a receptacle, and an optical chip according to one or more embodiments described and illustrated herein.

FIG. 11 schematically illustrates a top view of an example optical fiber ferrule 120 and an optical chip 100. An example receptacle 150 is attached to the first surface 113 of the optical chip 100 proximate the edge 112. The example receptacle 150 comprises a receptacle body 151 that is attached to the first surface 113 of the optical chip 100. The receptacle body 151 may be precisely positioned on the first surface 113 with respect to the optical waveguides 116 by a passive alignment process using a vision system, for example. Alignment fiducials may be located on the first surface 113 to assist in the precise placement of the receptacle body 151 with respect to the optical waveguides 116. As another example, precise mechanical alignment features, such as posts, tabs, recesses, trenches, and the like may be incorporated into the first surface and/or the receptacle body 151 for precise positioning of the receptacle body 151.

Figure 12:
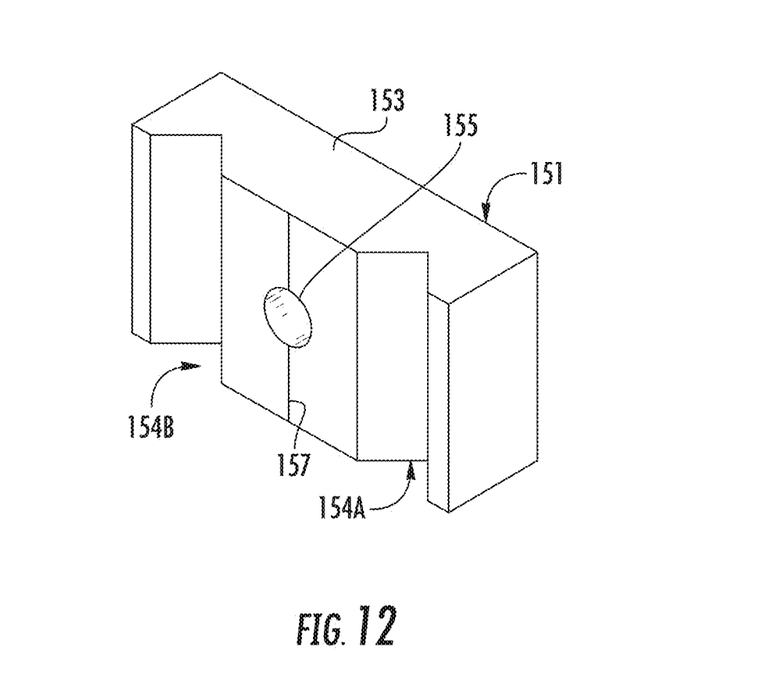
FIG. 12 schematically depicts a bottom perspective view of a receptacle body according to one or more embodiments described and illustrated herein.

An example receptacle body 151 is shown in FIG. 12. The example receptacle body 151 includes a mating face 153, and a first alignment groove 154A and a second alignment groove 154B operable to maintain a first alignment pin 152A and a second alignment pin 152B (FIG. 11), respectively. In the illustrated embodiment, the first and second alignment pins 152A, 152B are disposed between the first surface 113 and the receptacle body 151, and may be secured using an adhesive, for example. The example receptacle body 151 further comprises a hole 155 through which an adhesive may be disposed to secure the receptacle body 151 and the first and second alignment pins 152A, 152B to the optical chip 100. The adhesive will wick into a small gap between the receptacle body 151 and the first surface 113 of the optical chip 100. Symmetrical placement of the hole 155 and the first and second alignment grooves 154A, 154B may inhibit undesired movement of the receptacle body 151 and first and second alignment pints 152A, 152B.

The example receptacle body depicted in FIG. 12 further includes a center line 157 at a bottom surface that may be used as an alignment fiducial that is aligned with respect to one or more corresponding alignment fiducials located on the first surface 113 of the optical chip 100 (not shown). The center line 157 may be configured as markings disposed on the bottom surface of the receptacle body 151, or as a feature that is fabricated during manufacturing, such as during a molding process. It should be understood that more than one alignment fiducial may be provided on the receptacle body 151, and that the alignment fiducial(s) may take on shapes other than a line (e.g., circles, ellipses, crosses, and the like).

In other embodiments, the receptacle body may include alignment bores to maintain the first and second alignment pins 152A, 152B rather than the first and second alignment grooves 154A, 154B. For example, the receptacle body 151 may be molded over the first and second alignment pins 152A, 152B. It should be understood that many other receptacle configurations are also possible.

In some embodiments, the first and second alignment pins 152A, 152B may comprise one or more flexible features to increase flexibility to compensate for the higher elastic modulus of glass compared to that plastic. Example alignment pins including flexible alignment features are described in U.S. Pat. No. 8,768,125, which is hereby incorporated by reference in its entirety. Thus, flexible alignment pins may more easily be inserted into the alignment holes or bores provided by the more rigid glass material of the glass faceplate 121.

Figure 13A:
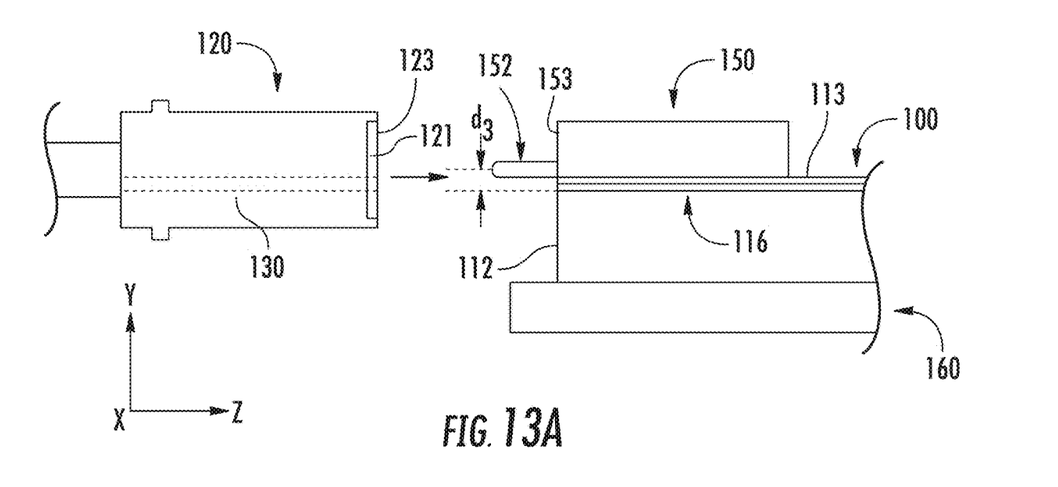
FIGS. 13A and 13B schematically depict side perspective views of the optical connection depicted in FIG. 12.
Figure 13B:
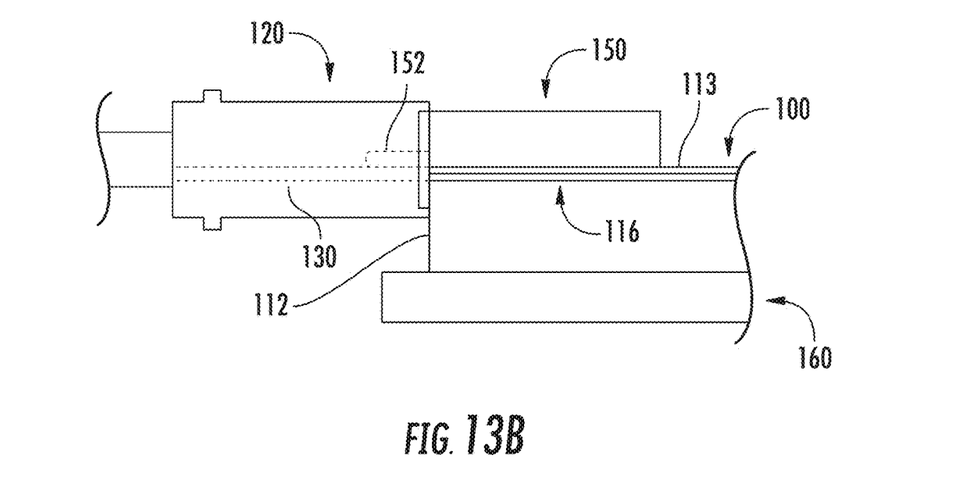

Referring now to FIG. 13A, an optical connection comprising an optical fiber ferrule 120, a receptacle 150 and an optical chip 100 is schematically illustrated. The receptacle 150 is mounted to the first surface 113 of the optical chip 100. The optical chip 100 is further mounted on a base substrate 160, such as a circuit board defining a daughter board. The alignment pins 152 extend beyond the mating face 153 and the edge 112 of the optical chip 110. In the illustrated embodiment, as the alignment pins 152 (i.e., first alignment pin 152A and second alignment pin 152B) are located on the first surface 113, the alignment pins 152 are offset from the optical waveguides 116 in a y-axis direction by an offset distance $d_3$. Thus, when mating an optical fiber ferrule to a receptacle 150 as illustrated in FIG. 13A, the glass fiber through-holes 124 should be offset from the first and second alignment holes 122A, 122B by the offset distance $d_3$. In one example, the glass faceplate 221 and a resulting glass-plastic hybrid optical fiber ferrule is utilized to accommodate the offset distance $d_3$. The glass faceplate 221 has forty-eight glass fiber through-holes 224 arranged in four rows according to industry standards. The alignment pins 152 of the receptacle 150 may be arranged on the first surface 113 of the optical chip 100 such that the distance between the alignment pins 152 and the optical waveguides is equal to the offset distance $d_3$. Therefore, the bottom row 224D of the glass fiber through-holes 224 (FIG. 8) will be aligned with optical waveguides 116 when the optical fiber ferrule 120 is mated with the receptacle 150 and optical chip 100 by inserting the alignment pins 152 of the into the alignment bores (e.g., first alignment hole 122A and second alignment hole 122B), as shown in FIG. 13B. Thus, in this embodiment, only the bottom row 224D of the glass fiber through-holes 224 will pass optical signals.

Use of a standard ferrule configuration, such as the forty-eight fiber arrangement depicted in FIG. 8, to accommodate the offset distance $d_3$ may be advantageous because conventional tooling may be utilized manufacture the glass-plastic hybrid optical fiber ferrules described herein. It should be understood that other arrangements are possible. For example, the glass faceplate may only include a single row of glass fiber through-holes offset from the alignment through-holes.

It is noted that the alignment pins described herein may be disposed within the optical fiber ferrule rather than the receptacle. Alternatively, each of the optical fiber ferrule and the receptacle may include at least one alignment pin and at least one alignment bore. Other configurations are also possible. It is further noted that other mechanical components may be provided on the optical fiber ferrule and/or the receptacle to secure the optical fiber ferrule to the receptacle and optical chip such as, without limitation, latches, tabs, magnets, and the like.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An optical fiber ferrule comprising:
   a glass faceplate;
   a plastic body molded about the glass faceplate; and
   at least one fiber through-hole extending through the plastic body.

2. The optical fiber ferrule of claim 1, wherein a portion of the glass faceplate is exposed at a mating side of the optical fiber ferrule.

3. The optical fiber ferrule of claim 1, wherein the glass faceplate comprises a borosilicate glass.

4. The optical fiber ferrule of claim 1, wherein the at least one fiber through-hole comprises a plurality of fiber through-holes.

5. The optical fiber ferrule of claim 4, wherein the plurality of fiber through-holes has a pitch greater than or equal to 100 µm and less than or equal 300 µm.

6. The optical fiber ferrule of claim 4, wherein the plurality of fiber through-holes has a pitch of 250 µm and each fiber through hole of the plurality of fiber through holes has a diameter of 80 µm.

7. The optical fiber ferrule of claim 4, wherein the plurality of fiber through-holes has a pitch of 125 µm and each fiber through hole of the plurality of fiber through holes has a diameter of 80 µm.

8. The optical fiber ferrule of claim 1, wherein the at least one fiber through-hole has a diameter greater than or equal to 50 µm and less than or equal to 200 µm.

9. The optical fiber ferrule of claim 1, wherein:
   the plastic body comprises at least one alignment bore;
   the glass faceplate comprises at least one alignment hole;
   a wall of the at least one alignment hole is lined with a plastic material of the plastic body; and
   the at least one alignment hole and the at least one alignment bore are configured to receive at least one alignment pin.

10. The optical fiber ferrule of claim 1, wherein:
    the glass faceplate comprises at least one glass fiber through-hole; and
    the at least one fiber through-hole is disposed within the at least one glass fiber through-hole.

11. The optical fiber ferrule of claim 9, wherein:
    the at least one glass fiber through-hole comprises a plurality of glass fiber through-holes; and
    the at least one fiber through-hole comprises a plurality of fiber through-holes disposed within the plurality of glass fiber through-holes.

12. The optical fiber ferrule of claim 11, wherein:
    the glass faceplate comprises a glass fiber through-hole configured as a slot; and
    the at least one fiber through-hole is disposed at the slot.

13. The optical fiber ferrule of claim 10, wherein the at least one fiber through-hole comprises a plurality of fiber through-holes.

14. The optical fiber ferrule of claim 10, wherein the at least one glass fiber through-hole of the glass faceplate is larger than the at least one fiber through-hole extending through the plastic body.

15. The optical fiber ferrule of claim 1, wherein the glass faceplate has a thickness that is greater than or equal to 0.5 mm and less than or equal to 2.0 mm.

16. The optical fiber ferrule of claim 1, wherein the glass faceplate has a thickness of 1 millimeter or less.

17. The optical fiber ferrule of claim 1, further comprising at least one optical fiber disposed within the at least one fiber through-hole.

18. The optical fiber ferrule of claim 1, wherein the plastic body covers a front surface of the glass faceplate, thereby defining a plastic cover layer.

19. The optical fiber ferrule of claim 1, wherein:
    the optical fiber ferrule is disposed within a connector housing of a fiber optic connector; and
    the at least one optical fiber is disposed within a fiber optic cable coupled to the connector housing.

20. The optical fiber ferrule of claim 1, wherein the glass faceplate comprises a material with a predetermined coefficient of thermal expansion in the range of 2.6±0.5 parts per million per degree Celsius.

21. An optical connection comprising:
an optical chip comprising at least one active optical component and at least one optical waveguide optical coupled to the active optical component;
an optical receptacle coupled to the optical chip;
an optical fiber ferrule comprising:
   a glass faceplate;
   a plastic body molded about the glass faceplate; and
   at least one fiber through-hole extending through the plastic body; and
at least one optical fiber disposed within the at least one fiber through-hole, wherein the optical fiber ferrule is configured to be mated to the optical receptacle such that the at least one optical fiber is optically coupled to the at least one optical waveguide.

22. The optical connection of claim 21, wherein a portion of the glass faceplate of the optical fiber ferrule is exposed.

23. The optical connection of claim 21, wherein the glass faceplate of the optical fiber ferrule is fabricated from a borosilicate glass.

24. The optical connection of claim 21, wherein the at least one fiber through-hole comprises a plurality of fiber through-holes.

25. The optical connection of claim 24, wherein the plurality of fiber through-holes has a pitch greater than or equal to 150 µm and less than or equal 200 µm.

26. The optical connection of claim 24, wherein the at least one fiber through-hole has a diameter greater than or equal to 100 µm and less than or equal to 200 µm.

27. The optical connection of claim 21, wherein:
the plastic body comprises at least one alignment bore;
the glass faceplate comprises at least one alignment hole;
a wall of the at least one alignment hole is lined with a plastic material of the plastic body;
the receptacle comprises at least one alignment pin; and
the at least one alignment hole and the at least one alignment bore are configured to receive the at least one alignment pin of the receptacle.

28. The optical connection of claim 21, wherein:
the plastic body comprises at least one alignment bore;
the glass faceplate comprises at least one alignment hole;
a wall of the at least one alignment hole is lined with a plastic material of the plastic body;
at least one alignment pin is disposed within the at least one alignment bore and the at least one alignment hole such that the at least one alignment pin extends beyond the glass faceplate;
the receptacle comprises at least one receptacle alignment bore within the end face; and
the at least one receptacle alignment bore is configured to receive the at least one alignment pin of the receptacle.

29. The optical connection of claim 21, wherein:
the glass faceplate comprises at least one glass fiber through-hole; and
the at least one fiber through-hole is disposed within the at least one glass fiber through-hole.

30. The optical connection of claim 29, wherein:
the at least one glass fiber through-hole comprises a plurality of glass fiber through-holes; and
the at least one fiber through-hole comprises a plurality of fiber through-holes disposed within the plurality of glass fiber through-holes.

31. The optical connection of claim 21, wherein:
the glass faceplate comprises at least one glass fiber through hole configured as a slot; and
the at least one fiber through-hole is disposed at the slot.

32. The optical connection of claim 21, wherein the glass faceplate has a thickness that is greater than or equal to 0.5 mm and less than or equal to 2.0 mm.

33. The optical connection of claim 21, wherein the receptacle is coupled to an edge of the optical chip.

34. The optical connection of claim 21, wherein the glass faceplate comprises a material with a predetermined coefficient of thermal expansion in the range of 2.6±0.5 parts per million per degree Celsius.

* * * * *